United States Patent
Russell

[15] 3,666,300
[45] May 30, 1972

[54] QUICK DISCONNECT COUPLING

[72] Inventor: John G. Russell, Highland Heights, Ohio

[73] Assignee: Parker-Hannifin Corporation, Cleveland, Ohio

[22] Filed: Mar. 26, 1970

[21] Appl. No.: 22,984

[52] U.S. Cl. ........................................................... 285/316
[51] Int. Cl. ................................................... F16l 37/08
[58] Field of Search ..................... 285/277, 315, 316, 404

[56] References Cited

UNITED STATES PATENTS

| | | | |
|---|---|---|---|
| 2,092,116 | 9/1937 | Hansen | 285/316 X |
| 2,344,740 | 3/1944 | Shaff | 285/316 X |
| 3,017,657 | 1/1962 | Mills | 285/404 X |
| 3,188,123 | 6/1965 | Hansen | 285/277 |
| 3,228,715 | 1/1966 | Neilon et al. | 285/315 X |

FOREIGN PATENTS OR APPLICATIONS 1,475,749  1/1969  Germany ..............................285/315

Primary Examiner—David J. Williamowsky
Assistant Examiner—David H. Corbin
Attorney—John N. Wolfram

[57] ABSTRACT

A fluid line coupling socket for quick attachment and release from a nipple, the socket having locking pins for retaining and releasing the nipple, the pins having a pair of generally oppositely facing shoulders at one end of the pins that are directly engageable by corresponding shoulders of a sleeve on the socket for moving the pins into and out of locking position.

6 Claims, 2 Drawing Figures

PATENTED MAY 30 1972 3,666,300

INVENTOR
JOHN G. RUSSELL
BY: John N. Wolfram
ATTORNEY

QUICK DISCONNECT COUPLING

BACKGROUND OF THE INVENTION

Quick disconnect couplings of the type shown in U.S. Pat. No. 2,092,116 employ a series of circumferentially spaced locking pins carried by a socket to engage in a groove of a nipple for holding the nipple in the socket. The pins retract by engagement with the nipple during insertion of the nipple. When the nipple is fully inserted the pins are engageable at their outer ends by a spring pressed sleeve for moving the pins into locking position within the nipple groove when the sleeve is manually moved in the opposite direction to engage the inner ends of the pins to move them out of the nipple groove. In this arrangement the sleeve is an expensive two-part construction with one part to engage the outer portion of the pins and the other part to engage the inner portion of the pins. The spring is contained between the two sleeve parts and the latter are permanently attached to each other in a manner to prevent disassembly from the socket. As a consequence, neither the spring nor the pins may be replaced without destroying the two part sleeve.

SUMMARY OF THE INVENTION

An object of the present invention is to provide a coupling socket having a one piece sleeve that is easy and inexpensive to manufacture and in which the sleeve is readily removable to permit replacement of either the locking pins or the sleeve spring. This is accomplished by forming the locking pins in the socket with generally oppositely facing shoulders at the radially outer end of the pins and forming the sleeve with an internal groove that provides two shoulders that generally face each other. One of the sleeve shoulders engages one of the shoulders on each pin to move each pin radially outward when the sleeve is moved in one axial direction and the other sleeve surface engages the other shoulder on each pin to move each pin radially inward when the sleeve is moved in an opposite axial direction. The pins are retained within the socket by a spring wire ring when the socket is detached from the nipple.

DETAILED DESCRIPTION

Figure 1:
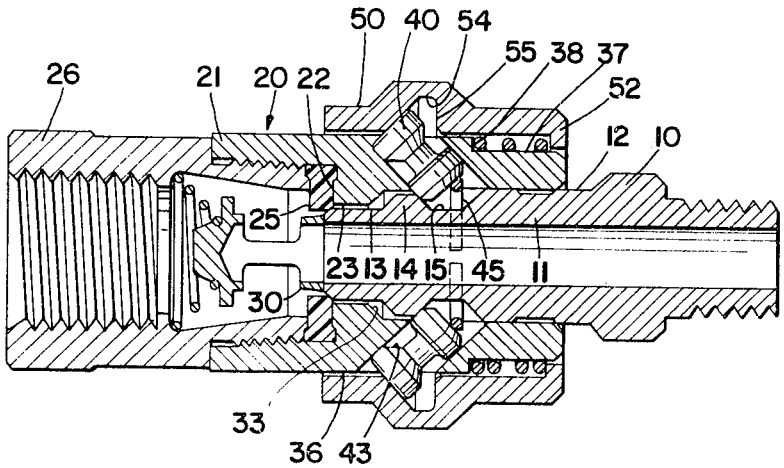
FIG. 1 is a cross section view of the socket and nipple in connected and locked position.
Figure 2:
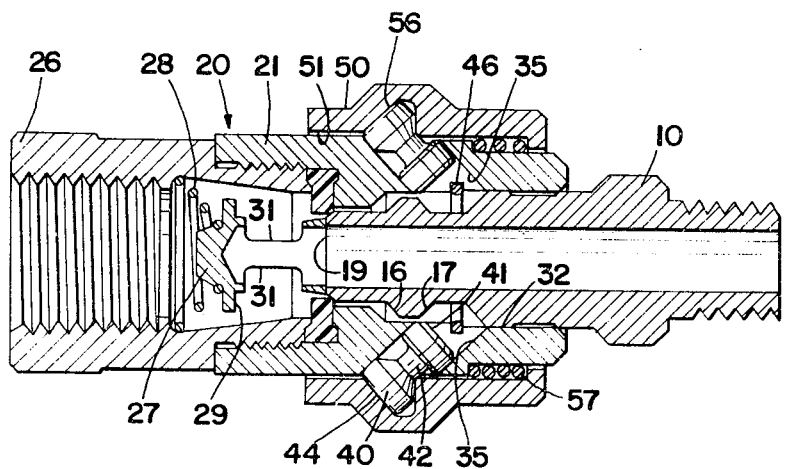
FIG. 2 is a cross section view of the socket and nipple in connected but unlocked position.

A standard nipple 10 has a generally tubular portion 11 with a rear cylindrical portion 12, a smaller diameter front cylindrical portion 13, an intermediate rib 14 and groove 15 that form front and rear nipple shoulders 16 and 17, and an end surface 19.

Coupling socket 20 has a body 21 with a shoulder 22 adjacent a bore 23. A resilient washer 25 is sealingly clamped against shoulder 22 by a cap 26 threaded into body 21. A poppet valve 27 is normally seated against washer 25 by a spring 28. The poppet valve has a tubular portion 30 with radial openings 31.

Body 21 has another bore 32 outwardly of bore 23 and of larger diameter to form a shoulder 33. A series of circumferentially spaced openings 35 intersect bore 32 and an exterior cylindrical surface 36 of body 21. These openings 35 are inclined, preferably at an angle of about 45°, from the longitudinal axis of bore 23. Body 21 has another cylindrical outer surface 37 and a radial shoulder 38.

Slideable within each opening 35 is a cylindrical pin 40 having an inner surface 41 that is substantially normal to the longitudinal axis of the pin. Each pin has a groove 42 that forms an inner shoulder 43 that generally faces away from an outer shoulder 44 formed by the outer end of the pin. A circumferentially split wire spring ring 45 mounted within an internal groove 46 in body 21 engages inner surfaces 41 of the pins to retain the pins within openings 35 when the coupling socket 20 is disconnected from nipple 10.

A sleeve 50 is telescoped over body 20 and has a cylindrical bore 51 that is a close sliding fit on surface 36. The sleeve has a flange 52 whose inner diameter is a close sliding fit on body surface 37. An internal groove 54 in bore 51 provides shoulders 55 and 56 that generally face each other. Shoulder 55 is generally rearwardly facing and is preferably normal to the axis of sleeve 50, although it may be inclined somewhat in either direction. Shoulder 56 is preferably at an angle of about 45° to the longitudinal axis of the sleeve.

A spring 57 bears against body shoulder 38 and flange 52 to normally urge sleeve 50 outwardly of body 20.

OPERATION

When socket 20 is disconnected and separated from nipple 10, sleeve spring 57 urges sleeve 50 outwardly of socket 20. This causes sleeve shoulder 56 to engage shoulders 44 of the pins to move the pins radially inwardly until they abut snap ring 45. This fixes sleeve 50 in an outward position upon body 21. At the same time, spring 28 moves tubular portion 30 of valve poppet 27 into bore 23 until seat 29 is against seat 25 to close bore 23 against passage of fluid therethrough.

To connect nipple 10 to the socket, tubular portion 12 is inserted into bores 32 and 23. As nipple portion 13 enters bore 32 its shoulder 16 engages the inner ends of the pins 40 to force them radially outwardly until the inner ends of the pins ride on the outer cylindrical surface of rib 14. The radially outward movement of the pins causes outer pin shoulders 44 to bear on sleeve shoulder 56 and move sleeve 50 rearwardly against the action of spring 57.

As nipple 10 is advanced further into the socket, groove 15 comes into register with pins 40 and the latter move radially inward into groove 15 and engage nipple shoulder 17 to prevent withdrawal of the nipple. Such inward movement of the pins is actuated by spring 57 urging sleeve 50 outwardly with sleeve shoulder 56 bearing on pin shoulders 43 to move the pins inwardly.

During the inward movement of the nipple its end surface 19 engages poppet valve tubular portion 30 to move poppet 27 to open position relative to seat 25.

To release the nipple from the socket, it is only necessary to manually move sleeve 50 inwardly. This causes sleeve shoulder 55 to bear against pin shoulders 43 and move the pins radially outwardly to a position where they disengage from shoulder 17 to permit withdrawal of the nipple 10. Subsequent release of sleeve 50 permits spring 57 to return the sleeve and pins to their position as shown in FIG. 1.

Being of one piece construction, sleeve 50 is inexpensive and simple to manufacture. Also, removal of snap ring 45 permits ready removal of pins 40. This releases sleeve 50 so that it can be removed from the socket in the event sleeve spring 57 or the pins should need replacement or repair.

I claim:

1. A quick coupling socket comprising a body having an annular portion defining a bore for receiving a nipple, said annular portion having a radial opening extending therethrough, a pin slidable in said opening, a sleeve axially moveable on the annular portion, said pin having a groove intermediate its ends and having oppositely facing shoulders, one of said shoulders being a wall of said groove, said sleeve having an internal surface surrounding the annular portion, an annular recess in said internal surface of the sleeve providing a pair of shoulders, one of the sleeve shoulders being engageable with one of the pin shoulders for moving the pin radially inward when the sleeve is moved in one axial direction and the other sleeve shoulder being engageable with the other pin shoulder for moving the pin radially outward when the sleeve is moved in the other axial direction, said pin shoulders facing other than radially inward where contacted by the respective sleeve shoulder, said sleeve shoulders constituting the only means for moving the pin in said axial direction and for maintaining said pin at the limits of said movement.

2. The socket of claim 1 in which the sleeve shoulders are generally radially extending side surfaces of said recess said sleeve shoulders facing other than radially outward.

3. The socket of claim 2 in which the axis of the pin is inclined relative to the axis of said bore, said one pin shoulder in inclined relative to the bore axis and said other pin shoulder is substantially normal to said bore axis.

4. A socket comprising a body having an annular portion defining a bore for receiving a nipple, a series of circumferentially spaced openings extending through the annular portion, the axis of each opening being sloped relative to the axis of said bore, a pin in each opening, a sleeve axially movable on the annular portion, each pin having a circumferential groove intermediate its ends forming a shoulder facing generally away from the outer end surface of the pin and having at least a portion thereof extending substantially perpendicular to the axis of said bore, said pin outer end surfaces extending generally perpendicular to the axis of the respective opening, said sleeve having an internal groove forming generally facing inner and outer shoulders, the outer shoulder lying in a plane perpendicular to the bore axis and engageable with said pin inner shoulders and the sleeve inner shoulder being generally perpendicular to the axes of the pins and engageable with the pin outer end surfaces, the annular portion having an internal groove that intersects the inner ends of said openings, a split spring ring in the groove and extending across said openings and engageable by the inner ends of the pins to limit inward radial travel of the pins, a spring between the body and sleeve urging the sleeve axially outwardly, and a cylindrical guide surface on the sleeve on each side of said internal groove engageable with a cylindrical surface on said annular portion for guiding the sleeve on said body.

5. A quick coupling socket comprising a body having an annular portion defining a bore for receiving a nipple, said annular portion having a radial opening extending therethrough and having an outer surface, a cylindrical pin slidable in said opening, a sleeve disposed on the outer surface of said annular portion and axially movable thereon, said pin having a groove therein intermediate the ends of the pin and having a side wall, said side wall and the outer end surface of the pin constituting oppositely facing shoulders, said sleeve having an inner wall with an annular groove formed therein, said groove having a pair of side surfaces that constitute a pair of shoulders, one of the sleeve shoulders being engageable with one of the pin shoulders for moving the pin radially inward when the sleeve is moved in one axial direction and the other sleeve shoulder being engageable with the other pin shoulder for moving the pin radially outward when the sleeve is moved in the other axial direction, said sleeve shoulders constituting the only means for moving the pin in said axial direction and for maintaining said pin at the limits of said movement, a separately removable abutment means in said body engaging said pin to limit radially inward travel of said pin, said abutment means comprising a split ring contained in an annular groove in said bore.

6. A quick coupling socket comprising a body having an annular portion defining a bore for receiving a nipple, said annular portion having a radial opening extending therethrough, the axis of the opening being slanted with respect to the longitudinal axis of the bore, a pin slidable in said opening, and having an axis coinciding with said opening axis, a sleeve axially movable on the annular portion, said pin having a groove intermediate its ends and having oppositely facing shoulders, said sleeve having an internal surface surrounding the annular portion, an annular recess in said internal surface of the sleeve providing a pair of shoulders, one of the sleeve shoulders being engageable with one of the pin shoulders for moving the pin radially inward when the sleeve is moved in one axial direction and the other sleeve shoulder being engageable with the other pin shoulder for moving the pin radially outward when the sleeve is moved in the other axial direction, said one of said pin shoulders and said one of said sleeve shoulders being substantially perpendicular with said pin axis and the other of said pin shoulders and the other of said sleeve shoulders being substantially perpendicular to the longitudinal axis of said bore where contacted by the respective sleeve shoulder.

* * * * *